United States Patent Office 3,508,305
Patented Apr. 28, 1970

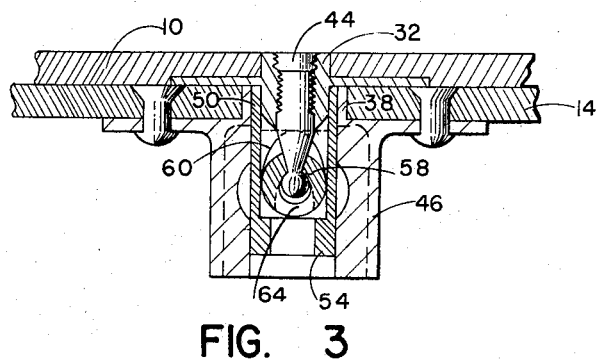
FIG. 3
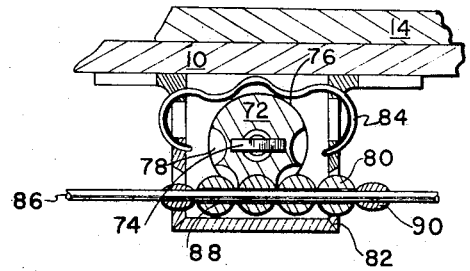
FIG. 4
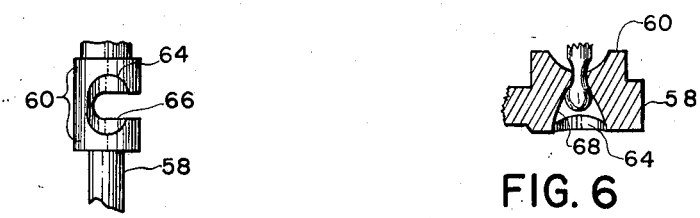
FIG. 5
FIG. 6
GEORGE W. KOONCE
DANIEL C. HAMILTON
  INVENTOR.
BY Charles C. Woodward
ATTORNEY

3,508,305
REMOTELY ACTUATED STRESSED
STRUCTURAL FASTENER
George W. Koonce and Daniel C. Hamilton, Fort Worth, Tex., assignors to General Dynamics Corporation, a corporation of Delaware
Filed Mar. 12, 1968, Ser. No. 712,464
Int. Cl. A44b *11/25, 11/00*
U.S. Cl. 24—205.18                                    8 Claims

---

ABSTRACT OF THE DISCLOSURE

A closure fastener system operable by a flexible cable for plural fastener units each incorporating both elements for locking a structural closure against both shear and bearing loads, locking being accomplished by at least partial insertion of a pin member into a housing recess, the pin being gripped and pulled to the fully closed or locked position by the camming motion of a camshaft, and the pin recess "closed" for shear loads by a sleeve member, both responsive to a drive wheel.

---

The present invention relates generally to quick action structural fasteners, and more particularly to a positively locking fast acting fastener and system permitting rapid access to stressed aircraft panels and the like.

It has become increasingly important to have access panels which may be readily opened and closed, and in particular, operable without the employment of tools. However, because of the design of most modern aircraft, and particularly high speed high performance aircraft, major portions of the "skin" of such aircraft are subject to varying loads and stresses making access panels extremely difficult to close, retain the lock due to the "warpage" or distortion of the structure adjacent the access panels. Since such panels are provided in numerous places of the aircraft to permit servicing and inspection of electronic and electrical components, hydraulics, controls, fuel lines, air conditioning and other equipment housed therein, structural integrity and capability are, of course, prime requisites, while quick and easy access has been a secondary criteria and, before the present invention, relatively unobtainable.

Up to the present time, such panels have been fastened with many individual bolts, such as disclosed in U.S. Patent No. 2,991,816 which bolts have been able to differentially or sequentially "warp" the panels to permit closure in a distorted opening. These fasteners are successful for the most part in permitting the closure and in insuring the structural integrity of the in-place panel, but are at best very time consuming, and require some skill as to the sequence and degree in which they are tightened, and require "tools" to achieve the tightening. The individual loosening and tightening of these devices becomes a major factor in maintenance "time." Additionally, such panels may require the utilization of ladders, crawlers, or special wrenches when all of the fasteners are not within easy reach of the operator. The present invention overcomes all of these deficiences of the prior art, and for the first time makes rapid, easy operation of load bearing panels possible.

It is accordingly an object of the present invention to provide a remotely actuated fastener for stressed access panels.

Another object is the provision of a panel fastener system which is capable of carrying shear and tension loads existing between a panel and its adajacent structure.

A further object is the provision of a remotely actuated panel fastener which will permit a substantially constant diameter pin attached to a panel to be moved in and out of a fitting free of misalignment interference, but capable on latching of holding the pin down, aligning the panel, and closing any openings around the pin to transmit both shear and tension stresses.

Other objects and features of the preesnt invention will be readily apparent to those skilled in the art from the the following specification taken in conjunction with the drawings, wherein:

FIGURE 1 diagrammatically illustrates the fastener system of the invention employed as a structural fastener attaching a hinged panel to a basic structure;

FIGURE 3 is a sectional, elevational view of the fastener of FIGURE 1 rotated 90° and showing the fastener in the locked position;

FIGURE 4 is a sectional view in elevation of the fastener drive wheel and cable drive mechanism;

FIGURE 5 is a plan view of the crankshaft; and

FIGURE 6 is an elevational sectional view of the crankshaft and engagement pin in the locked position.

Figure 1:
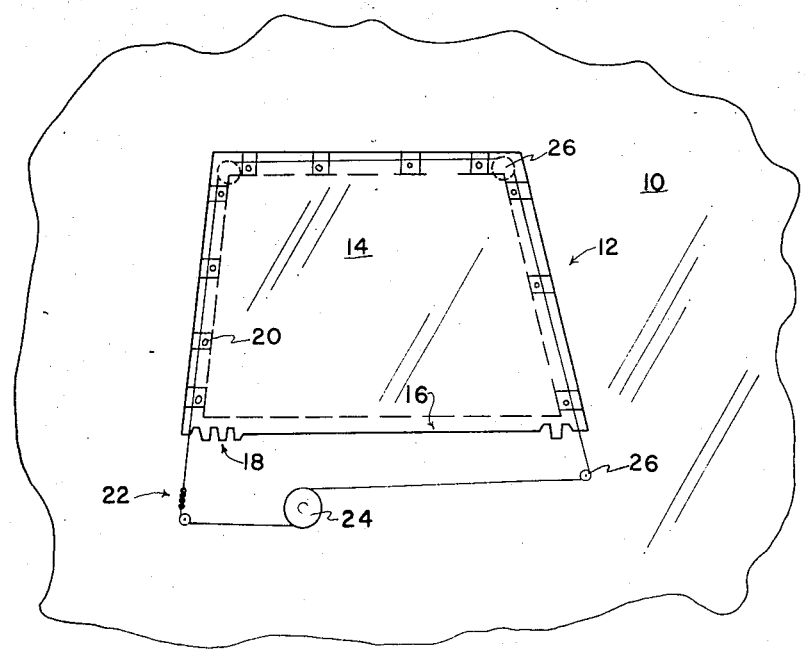

Referring first to FIGURE 1 for general orientation, there is shown a support structure 10 in which an access panel opening 12 is formed, an access panel 14 positioned within the opening 12 and attached at 16 to support structure 10 for outward movement, as by hinges 18. Fasteners 20 are located around the periphery of closure panel 14, to be operated by cable-ball mechanism 22, which is fixed at each end to cable drive actuator 24, the cable-ball mechanism running from actuator 24, along the sides of closure 14 through pulleys 26. Obviously, actuator 24 may be located on panel 14 itself, or on the adjacent structure 10 as shown, or other "drive" means employed. The system is operated by driving the cable-ball mechanism through fasteners 20 in opposite directions to lock or unlock the fasteners. It will also be obvious that the fastners may be actuated sequentially to permit the greatest degree of flexibility, or in predetermined groups, or simultaneously, depending on the design criteria.

Figure 2:
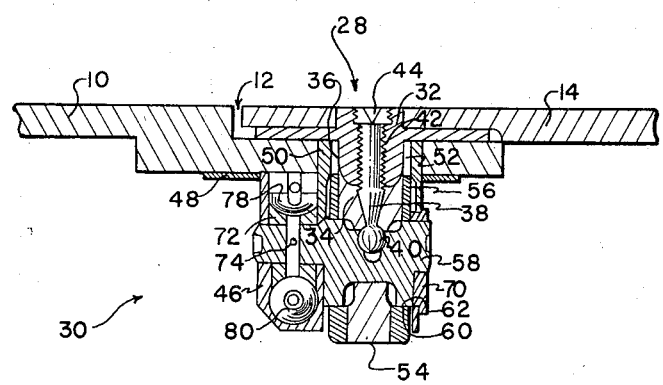
FIGURE 2 is a sectional elevational view showing the fastener of the present invention in the unlatched position.

Referring now to FIGURE 2, the fastener 20 comprises two major parts, insert portion 28 and locking portion 30. It is noted that FIGURE 2 shows the fastener in the unlocked position.

Insert portion 28 is attached to closure panel 14 by any conventional means and comprises a mating pin 32 having camming shoulders 34, guide wall 36, engagement pin 38 being fixed therein, pin 38 having a "ball" or knob head 40. As shown, engagement pin 38 may be adjustably attached to mating pin 32, as by threads 42, using a self-locking device so that engagement pin 38 may be adjusted to any desired "tight" condition for mating with the locking portion 30. A flush plug 44 may be used to seal the adjusting tool recess if desired.

Locking portion 30 comprises housing 46 provided with a flange portion 48 for attachment to support structure 10. Housing 46 forms a cover haivng positioning wall 50 for insertion in a preformed aperture 52 forming an oversize hole. Floating sleeve 54, passing through housing 46 vertically, is sized at one end 56 to fit into aperture 52 between side wall 36 of mating pin 32 and housing position wall 50 to assure a tight fit for stress transmission and one not subject to excessive vibration. Sleeve 54 is caused to move upwardly (from the unlocked position shown in FIGURE 2) by camming action of crankshaft 58. Crankshaft 58 passes through housing 46 longitudinally, and through sleeve 54, crankshaft 58 having camming surfaces 60 for engagement with recess shoulders 62 of sleeve 54 to assure full lock and unlock actuation of sleeve 54. Crankshaft 58 (see FIGURES 5 and 6) has a clearance hole 64 positioned so as to permit knob head 40 of engagement pin 38 to freely enter and protrude into the interior of crankshaft 58 when the crankshaft is in the "open" position (as in FIGURE 2). A slot 66 having camming surfaces 68 (FIGURE 6) engages the rear portion of pin 38 on rotation of the crankshaft, thus pulling insert portion 28 down while forcing sleeve 54 up, assuring a positive and close fitting (shear transmitting) locking action, while "centering" insert portion 28 in its proper position. This action thus permits "pull-up" of the closure panel 14 in both the vertical (tension inducing) and the horizontal (shear inducing) directions, accomplishing closure against load induced mismatch between closure and primary structure, and permitting the in-place closure to function as a structural load transmitting member. Crankshaft 58 is journaled in the housing 46 by housing cap 70, housing position flange 50 and a crankshaft bearing which may comprise, as shown, housing wall 46. Adjacent wall 46, drive wheel 72 (FIGURES 2 and 4) is attached to crankshaft 58 by drive wheel retaining pin 74 so that crankshaft 58 will rotate therewith. Drive wheel 72 is provided on its periphery 76 with semi-spherical recesses 78 formed substantially on the same radius as balls 80 and engageable therewith. Balls 80 are caused to pass through guide hole 82 of housing 46 and the periphery 76 of wheel drive 72, rotating wheel drive 72 through engagement of ball 80-recess 78. As best seen in FIGURE 4, drive wheel positioning spring 84 retains drive wheel 72 in position to prevent vibratory loads from rotating it, but is readily overcome on actuation of the wheel by the cable-ball mechanism 22. Obviously, the leaf spring 84 shown may readily be replaced by other equivalent spring means, as for example, coil springs positioned through (across) drive wheel 72 with ball bearings positioned at each end for engagement in recesses in walls 46, 50. This latter method has the advantage of providing a two-position lock-unlock attitude for wheel 72 to prevent the wheel drive mechanism from getting out of "synchronization" for the lock-unlock cycles, thus assuring the device cannot be jammed due to improper useage or vibration.

In operation, the panel 14 is swung in until pin 32 of insert portion 28 enters clearance hole 64 of crankshaft 58. Cable-ball mechanism 22 is actuated in the locking direction by drive actuator 24, causing balls 80 to pass through guide hole 82 of housing 10, the first ball engaging the drive wheel recess 78 closest to the "down" position, successive balls engaging successive recesses and causing drive wheel 72 to rotate. Since wheel 72 is attached to crankshaft 58 by retaining pin 74, crankshaft 58 is caused to rotate, camming surface 68 adjacent slot 66 engaging the back of knob head 40 of engagement pin 38, pulling pin 38 down to force panel 14 to the close (fully down) position. Provision for slight lineal movement of crank shaft 58 should be made to permit easy initial gripping of pin head 40 and reduce resultant stresses therein. This also permits relatively "easy" tolerances for manufacturing purposes. After the partial rotation of crankshaft 58, and consequent downward camming of engagement pin 38, crankshaft camming surface 60 forces sleeve 54 upward through engagement of their facing surfaces. As sleeve 54 is cammed upwardly, closure portion 56 is forced past mating pin shoulder 34, centering mating pin 32 in the recess of locking portion 30 to compensate for lateral deformation, portion 56 continuing up into housing aperture 52 to the limit of its travel, thus filling the aperture and assuring a "tight" shear transmitting fit laterally between insert portion 28 and locking portion 30, the fastener thereby carrying any loads imposed on support structure 10 into panel 14. Unlocking is accomplished through a reversal of the above described actuation, thus assuring a positive "unlocking" of the insert and locking portions of fastener 20.

Cable-ball assembly 22 may comprise a flexible cable 86 threaded through balls 80, balls 80 having aperture 88 which is slightly larger than cable 86 to permit some "slop" in the positioning of balls 80 for easy engagement with drive wheel recesses 78. Stop 90 is fixed to cable 86 on each side of the ball group to permit slight movement adjacent balls. Since, as shown, the crankshaft rotates approximately one-half turn to latch or unlatch pin 38, the size of the recesses of the drive wheel, the size of the drive wheel itself, and the size of the balls 80, will vary the number of balls required to complete locking. It has been found that forming recesses 78 so that there is only one more recess than drive balls 80 also aids in preventing missynchronization of the drive wheel, the additional recess being on the "lock" side. Obviously, each of these features may be varied within limits to permit slower or faster actuation, or more or less manufacturing tolerances, or variations in the loads and stresses, as well as panel mismatch, which are to be compensated for. The specific configuration shown is that which is presently preferred in the specific present application.

In the present use of the device of the invention, the system was compared to an identical system employing fasteners substantially identical to those of U.S. Patent No. 2,991,816. A structural panel having a stress of 37,000 p.s.i. and dimensions of 30 inches by 33 inches was evaluated. The design loads dictated use of 60 of the —816 fasteners to carry the loads, and its removal and replacement (one man) required an average of approximately 54 minutes per each operation. The same design criteria dictated a system of 20 fasteners of the present invention, while removal and replacement were accomplished in an average of 12 seconds. In this particular panel, pullup in both the vertical and lateral directions (relative to the panel) was about ½ inch overall. Although the total deformation of a panel which can be compensated by the invented system wall vary with the particular panel, use, etc., the above figures are relatively typical. The relationship of removal and installation time has been found to be substantially constant, as has the "number" of fasteners. Tests also indicate that tensile stresses in excess of 15,000 p.s.i. and shear stresses in excess of 8,000 pounds are readily achievable with minimum sized fasteners, and it is noted that all failures (in excess of the above loads) have been between the support structure and the mating pin attach points, rather than in the panel per se. Provision may, of course, be made to facilitate unlocking of the fastener should failure occur in it attach points, or in the drive or cable system.

It has been found that threading the engagement pin 38 and the mating pin 32 readily provides a means of "unlocking" individual fasteners, as well as "forcing" a jammed panel outwardly for removal. This may be accomplished by screwing engagement pin 38 in until the head 40 bottoms out on the lower surface of recess or slot 66. As the pin continues down, it forces the panel up. Obviously, when pin 38 clears pin 32, the fastener is separated. The pin 38 may then be removed from housing 46 and re-inserted into pin 32 for normal use. Tests have shown that, for the panel described above, and under the same conditions, one man can readily unlatch all fasteners in the panel and remove the panel in five minutes.

As thus described, a structural fastener has been provided which permits a panel to be positioned, free of misalignment interference, on a support structure and which will quickly and positively, provide a shear and tension tie between the access panel and a support structure, yet is readily removable under any circumstance. Where no "load" is to be accounted for in such an access panel, the present fastener still offers major advantages over prior art fasteners due to its positive locking, non-critical positioning, repeatability with out failure inducing wear (such as heads and threads of the ordinary fastener), and rapidity of operation.

We claim:
1. A fastener comprising:
 (A) an insert porition attachable to a movable panel member, said insert portion including a headed pin;

(B) a locking member attachable to a support structure and receiving said insert portion, said locking member comprising:
(1) housing means; and
(2) locking means rotatably journaled in said housing for gripping said insert portion responsive to a rotational motion imparted to said locking means, said locking means comprises a crankshaft having a pin clearance hole positioned there in for reception of said pin, a slot extended from said clearance hole at least partially around said crankshaft, the interior surfaces of said slot forming a cam surface for engagement with said headed pin to force said pin into said crankshaft and operative to pull said insert portion and said locking means together and a sleeve member responsive to rotation of said crankshaft to close the recess between said housing means and said insert portion to transmit shear loads across said fastener when said headed pin and said locking means are fully engaged.

2. A fastener comprising:
(A) an insert portion having a headed pin and a mating pin portion having a diameter larger than said headed pin and defining an insert portion centering means, said mating pin having at least one shoulder defining a camming surface responsive to said locking means operative to center said pin on locking thereof;
(B) a locking member attachable to a support structure and receiving said insert portion, said locking member comprising:
(1) housing means; and
(2) locking means rotatably journaled in said housing, said locking means comprising a crankshaft having a clearance hole opening to the interior of said crankshaft to receive said headed pin, said clearance hole extending around at least a portion of said crankshaft, said extension defining a slot of width less than said clearance hole operable to engage said headed pin on rotation of said crankshaft to affect locking, said locking means including a sleeve member slideably positioned in said locking means and around said crankshaft, said sleeve having a camming surface therein for engagement with a cam on said crankshaft on rotation thereof, said sleeve slideably engaging said mating pin on locking rotation of said crankshaft; and said crankshaft has a camming surface on the exterior portion for coaction with said cam surface of said sleeve.

3. The fastener defined by claim 2 wherein:
(A) said slot in said crankshaft forms on the interior surface thereof a cam surface for pulling engagement with said headed pin to cause said pin to be pulled toward said locking member and into said crankshaft to assure seating of a panel to which said insert portion is attached.

4. A fastener comprising:
(A) an insert portion including a headed pin comprising:
(1) a first pin means having means thereon for attachment to an associated panel member, said first pin means having a recess formed therein and being threaded on the interior surface of said recess,
(2) a second pin means having threads on the exterior portion thereof for engagement with the threads of said first pin means, said second pin means adapted for being driven through said first pin means and adjustable longitudinally therein to vary the length of said second pin means extended out of said first pin means, said second pin means on being driven through said first pin means engaging the side of said crankshaft remote therefrom to separate said insert and said locking means and force them apart;
(B) a locking member attachable to a support structure and receiving said insert portion, said locking member comprising:
(1) housing means, and
(2) locking means rotatably journaled in said housing for gripping said insert portion responsive to a rotational motion imparted to said locking means, said locking means comprising a crankshaft having a pin clearance hole positioned therein for reception of said pin, a slot extended from said clearance hole at least partially around said crankshaft, the interior surface of said slot forming a cam surface for engagement with said headed pin to force said pin into said crankshaft and operative to pull said insert potion and said locking means together.

5. The fastener defined by claim 3 comprising:
(A) a drive wheel fixed to said crankshaft at right angles thereto, and on rotation providing a mechanical advantage for rotating said crankshaft during the locking motion thereof;
(B) a cable having a plurality of balls limitedly moveably fixed thereon, said balls moveable with said cable through said housing, each said ball engageable with correspondingly configured recess in the periphery of said drive wheel operative to cause rotation of said wheel.

6. The fastening device defined by claim 5 wherein:
(A) said mating pin is provided with a recess therein, said recess having threads on the interior surface thereof adapted for threaded engagement with said headed pin; and
(B) said headed pin includes a threaded portion for engagement with said recess of said mating pin operative for driving said headed pin through said mating pin for adjustment of said headed pin longitudinally of said mating pin and on being driven operative to bottom out on said crankshaft recess in the locked position to force said insert and locking members apart and disconnect said members from each other.

7. A fastener system comprising:
(A) drive means;
(B) cable means forming a substantially closed loop and attached at each end to said drive means and having means thereon to impart rotational movement to a fastener locking means;
(C) a plurality of fasteners each comprising:
(1) an insert means attachable to a movable panel member, said means including a headed pin adapted to extend from the plane of the movable panel member;
(2) means attachable to a support structure and receiving and centering said headed pin of said insert portion, and comprising
a housing means, and a locking and centering means rotatably journaled in said housing means for gripping said insert portion responsive to rotational motion imparted to said locking means, said locking means comprising a crankshaft defining a receiving and camming means for said headed pin operative on crankshaft rotation to draw said headed pin into said crankshaft and center said pin, said crankshaft rotatably responsive to linear motion of said cable means through said housing means and locking said insert means on rotation of said crankshaft.

8. The fastener system defined by claim 7 wherein:
(A) said drive means comprises a remote actuator;
(B) said cable means includes at least one group of ball-like members limitedly moveably attached to said cable, said ball-like members cooperative with a fastener locking means;
(C) said insert means comprising
  (1) a mating pin having panel attaching means cooperative therewith, said mating pin having a threaded base therein and an outer configuration defining a guide wall of a lesser diameter than the mating recess of a panel to which said mating pin will lock, said outer configuration terminating in an inclined shoulder for cooperatively cammingly centering said mating pin with respect to a locking means,
  (2) an engagement pin threaded over at least a portion of its length for cooperative engagement with said mating pin bore, said engagement pin having a driving tool receiving recess on one end and a headed portion on the other, said headed portion engageable with said locking means;
(D) said locking means comprising a crankshaft positioned transversely of said housing and having bearing surfaces at the ends thereof for rotational movement therein, said crankshaft having a clearance hole therein positioned for reception of said engagement pin headed portion of a diameter slightly greater than the diameter of said headed portion, said clearance hole opening to a slot contiguous therewith having a width less than the diameter of said engagement pin headed portion, the inside portions of said slot forming camming surfaces engageable with said engagement pin headed portion to cam said insert means toward said locking means, said crankshaft having cam means on its outer surface for cooperative engagement with a sleeve and operative to cam the sleeve up on locking rotation and down on unlocking rotation;
(E) drive wheel means fixed on said crankshaft to rotate said crankshaft responsive to rotational movement of said wheel, said wheel having a plurality of recesses on the periphery thereof for cooperative successive engagement with said group of ball-like members wherein linear motion of said cable means causes said ball-like members to successively engage said recesses and impart rotational movement to said wheel;
(F) said housing having a guide hole for reception and lineal passage of said ball-like members, said guide hole in cooperative relationship to said drive wheel, a portion of said housing defining an oversize hole in cooperative relationship to said mating pin, said housing portion comprising a wall spaced from said mating pin guide wall when mated;
(G) a sleeve positioned for slideable movement in said housing responsive to rotational movement of said crankshaft through cam surfaces engaged with said outer cam means of said crankshaft, one end of said sleeve adapted on the inner side for camming sliding engagement with said mating pin guide wall and shoulder and on the outer side for sliding engagement with the inner portion of said housing defining an oversize hole so that on locking of said fastener through rotation of said crankshaft said sleeve is forced between said housing portion and said mating pin to fill the oversize hole formed thereby, operable to transmit shear loads through said fastener from a fixed panel to a removeable panel.

References Cited

UNITED STATES PATENTS

| | | | |
|---|---|---|---|
| 529,147 | 11/1894 | Oostrum | 24—205.18 |
| 1,700,557 | 1/1929 | Cherniack | 292—50 |

FOREIGN PATENTS

| | | |
|---|---|---|
| 49,251 | 10/1889 | Germany. |
| 236,972 | 7/1911 | Germany. |
| 545,848 | 6/1942 | Great Britain. |

BERNARD A. GELAK, Primary Examiner

U.S. Cl. X.R.

24—205.19, 211; 292—50, 51